US011662949B2

(12) United States Patent
Oh et al.

(10) Patent No.: US 11,662,949 B2
(45) Date of Patent: May 30, 2023

(54) STORAGE SERVER, A METHOD OF OPERATING THE SAME STORAGE SERVER AND A DATA CENTER INCLUDING THE SAME STORAGE SERVER

(71) Applicant: SAMSUNG ELECTRONICS CO., LTD., Suwon-si (KR)

(72) Inventors: Myoung Won Oh, Hwaseong-si (KR); Ji Woong Park, Seoul (KR); Sung Kyu Park, Seoul (KR); Kyu Ho Son, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/353,138

(22) Filed: Jun. 21, 2021

(65) Prior Publication Data
US 2022/0137879 A1 May 5, 2022

(30) Foreign Application Priority Data
Nov. 4, 2020 (KR) .................. 10-2020-0145767

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01); *G06F 3/065* (2013.01); *G06F 3/0611* (2013.01)
(58) Field of Classification Search
CPC ...... G06F 3/0659; G06F 3/0604; G06F 3/067; G06F 2212/225; G06F 3/0611;
(Continued)

(56) References Cited

U.S. PATENT DOCUMENTS 7,475,207 B2  1/2009  Bromling et al.
7,739,239 B1  6/2010  Cormie et al.
(Continued)

FOREIGN PATENT DOCUMENTS

KR      10-0954603 B1    4/2010
KR   10-2016-0106187 A   9/2016
(Continued)

OTHER PUBLICATIONS

Communication dated Apr. 1, 2022 issued by the European Patent Office in application No. 21198059.4.
(Continued)

*Primary Examiner* — Masud K Khan
(74) *Attorney, Agent, or Firm* — Sughrue Mion, PLLC

(57) ABSTRACT

A storage server and a method of driving the storage server are provided. The storage server includes a processor configured to: generate a plurality of flush write commands based on a write command of first data provided from a host, provide a replication command corresponding to the write command to an external storage server, and receive an operation completion signal of the replication command from the external storage server; a memory storing a program of a log file to which the plurality of flush write commands are logged; and a storage device configured to receive a multi-offset write command including one or more flush write commands logged to the log file, and perform a flush operation on the multi-offset write command. The processor is further configured to provide the multi-offset write command to the storage device based on the log file after receiving the operation completion signal.

20 Claims, 18 Drawing Sheets

(58) Field of Classification Search
CPC .............. G06F 3/065; G06F 2212/154; G06F 2212/261; G06F 2212/283; G06F 2212/313; G06F 12/0868; G06F 2212/1024; G06F 2212/214; G06F 2212/286; G06F 2212/311
See application file for complete search history.

(56) References Cited

U.S. PATENT DOCUMENTS

| | | | |
|---|---|---|---|
| 7,899,791 B1 | 3/2011 | Gole | |
| 8,793,531 B2 | 7/2014 | George et al. | |
| 8,862,617 B2 | 10/2014 | Kesselman | |
| 9,477,557 B2 | 10/2016 | Larson et al. | |
| 11,210,009 B1* | 12/2021 | Freilich | G06F 11/2071 |
| 2020/0225868 A1* | 7/2020 | Dalmatov | G06F 3/0655 |
| 2021/0216569 A1* | 7/2021 | David | G06F 3/0683 |

FOREIGN PATENT DOCUMENTS

| | | |
|---|---|---|
| KR | 10-1694980 B1 | 1/2017 |
| KR | 10-2020-0055898 A | 5/2020 |

OTHER PUBLICATIONS

Communication dated Mar. 21, 2022 issued by the European Patent Office in application No. 21198059.4.
Son, Y., et al., "Design and implementation of an efficient flushing scheme for cloud key-value storage", Cluster Computing, vol. 20, No. 4, Aug. 24, 2017, XP036355962, pp. 3551-3563.

* cited by examiner

FIG. 10

| Index(LSN) | operation | address | data |
|---|---|---|---|
| LSN1 | Delete | LPNd | |
| LSN2 | Delete | LPNe | |
| LSN3 | Update | LPNj | Data D |
| LSN4 | Delete | LPNf | |
| LSN5 | Update | LPNk | Allocator D |
| LSN6 | Insert | LPNm | Data E |
| LSN7 | Insert | LPNn | Allocator E |
| LSN8 | Update | LPNp | Data F |
| LSN9 | Insert | LPNo | Metadata E |
| LSN10 | Insert | LPNa | Data A |
| LSN11 | Insert | LPNb | Allocator A |
| LSN12 | Update | LPNl | Metadata D |
| LSN13 | Insert | LPNc | Metadata A |
| LSN14 | Update | LPNg | Data C |
| LSN15 | Update | LPNh | Allocator C |
| LSN16 | Update | LPNi | Metadata C |

223p

⟹ 1st MO_WCMD

FIG. 11

| Index(LSN) | operation | address | data |
|---|---|---|---|
| LSN1 | Delete | LPNd | |
| LSN2 | Delete | LPNe | |
| LSN3 | Update | LPNj | Data D |
| LSN4 | Delete | LPNf | |
| LSN5 | Update | LPNk | Allocator D |
| LSN6 | Insert | LPNm | Data E |
| LSN7 | Insert | LPNn | Allocator E |
| LSN8 | Update | LPNp | Data F |
| LSN9 | Insert | LPNo | Metadata E |
| LSN10 | Insert | LPNa | Data A |
| LSN11 | Insert | LPNb | Allocator A |
| LSN12 | Update | LPNl | Metadata D |

223p

T later ⟹ 2$^{nd}$ MO_WCMD

STORAGE SERVER, A METHOD OF OPERATING THE SAME STORAGE SERVER AND A DATA CENTER INCLUDING THE SAME STORAGE SERVER

CROSS-REFERENCE TO RELATED APPLICATION

This application is based on and claims priority under 35 U.S.C. § 119 to Korean Patent Application No. 10-2020-0145767 filed on Nov. 4, 2020 in the Korean Intellectual Property Office, the disclosure of which is incorporated by reference herein in its entirety.

BACKGROUND

1. Field of the Invention

One or more embodiments of the disclosure relate to a storage server, a method of driving the storage server, and a data center including the storage server.

2. Description of the Related Art

A block service is used under a distributed environment, in a virtual machine, a data center or the like. However, since the block service is provided as a local block service, there is a need for strong consistency in features among a plurality of local blocks, by quickly reading the latest write data at the time of reading. A high level of consistency across applications stored in databases requires a high degree of reliability, and the consistent features require more reading of the write data than the inconsistent features.

In particular, since a server/node replication process is required when writing in the distributed environment, a context switch is required along with the write operation, which increases latency and inefficiency in a processor such as a central processing unit (CPU) and degrades performance of the overall distributed environment.

SUMMARY

One or more embodiments of the disclosure provide a storage server in which a context switch is reduced to increase a CPU efficiency.

One or more embodiments of the disclosure provide a storage server that performs an operation related to a multi-offset write command that requests a plurality of write operations at once.

However, certain aspects, features and advantages of the disclosure are not limited to the one or more embodiments set forth herein. Other aspects, features, and advantages of the disclosure will become more apparent to one of ordinary skill in the art to which the disclosure pertains from the following description.

According to an embodiment, there is provided a storage server including: a processor configured to: generate a plurality of flush write commands based on a write command of first data provided from a host, provide a replication command corresponding to the write command to an external storage server, and receive an operation completion signal of the replication command from the external storage server; a memory storing a program of a log file to which the plurality of flush write commands are logged; and a storage device configured to receive a multi-offset write command including at least one from among the plurality of flush write commands logged to the log file, and perform a flush operation on the multi-offset write command, wherein the processor is further configured to provide the multi-offset write command to the storage device based on the log file, after receiving the operation completion signal.

According to an embodiment, there is provided a method of driving a storage server. The method includes: generating a plurality of flush write commands based on a write command of first data provided from a host; logging the plurality of flush write commands to a log file; providing a replication command corresponding to the write command to an external storage server; receiving an operation completion signal of the replication command from the external storage server; and providing a storage device with a multi-offset write command including at least one from among the plurality of flush write commands.

According to an embodiment, there is provided a data center including: an application server providing a write command for first data; a first storage server and a second storage server. The first storage server includes: a first processor configured to generate a plurality of first flush write commands based on the write command from the application server, and provide a replication command corresponding to the write command to a second storage server; a first memory storing a first program of a first log file to which the plurality of first flush write commands are logged; a first storage device configured to receive a first multi-offset write command including at least one from among the plurality of first flush write commands, and perform a first flush operation on the first multi-offset write command. The second storage server includes: a second processor configured to generate a plurality of second flush write commands based on the replication command provided from the first storage server, and provide an operation completion signal to the first storage server; a second memory storing a second program of a second log file to which the plurality of second flush write commands is logged; and a second storage device configured to receive a second multi-offset write for at least one from among the plurality of second flush write commands, and perform a second flush operation based on the second multi-offset write command. The first processor is further configured to provide the first storage device with the first multi-offset write command based on the first log file after receiving the operation completion signal, and the second processor is further configured to provide the second storage device with the second multi-offset write command based on the second log file after receiving the operation completion signal.

BRIEF DESCRIPTION OF THE DRAWINGS

Certain aspects, features and advantages of the disclosure will become more apparent from the following description taken in conjunction with the accompanying drawings, in which:

FIGS. 5 to 13 are diagrams for explaining operations of a storage server according to various embodiments;

DETAILED DESCRIPTION

Figure 1:
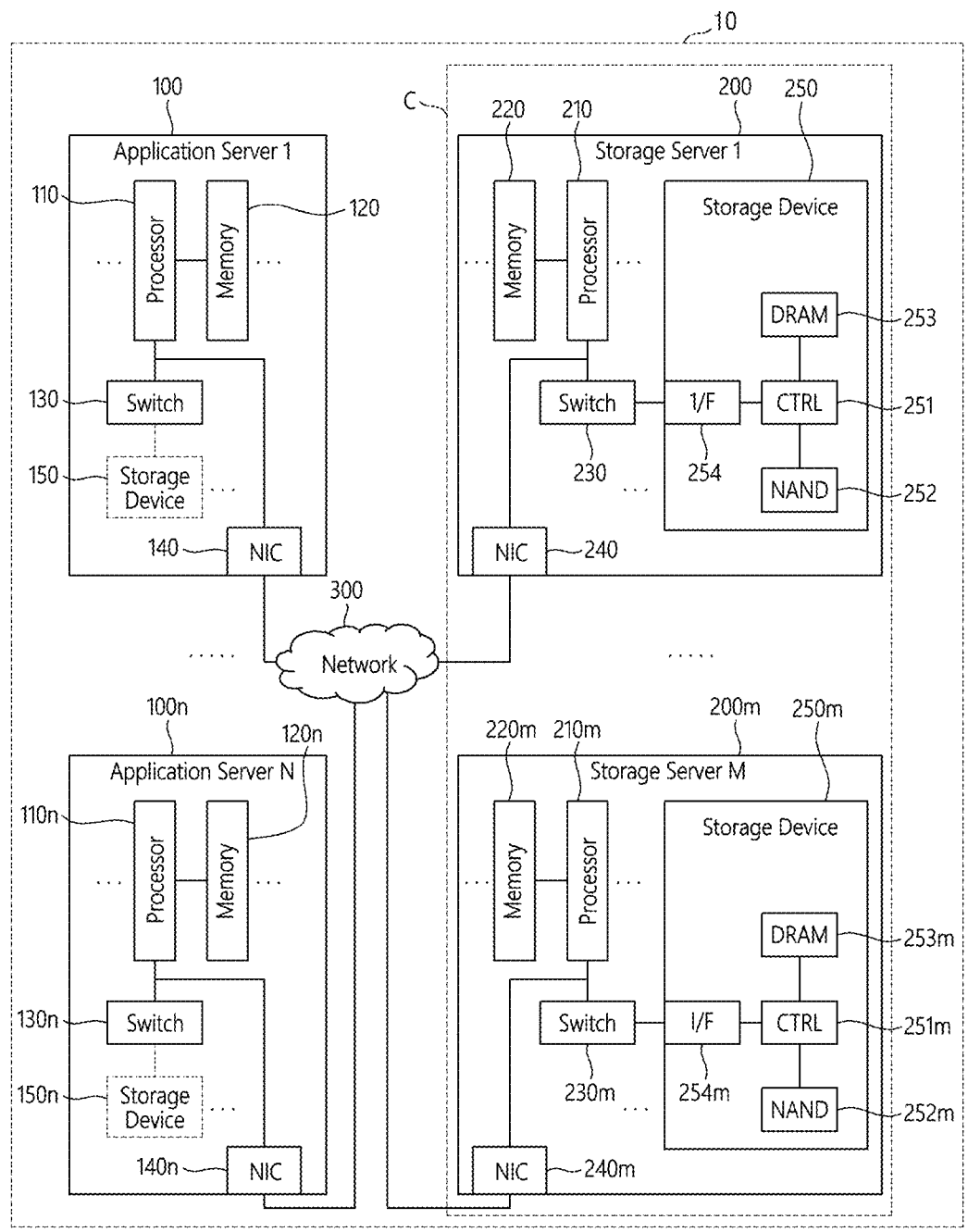
FIG. 1 is a block diagram illustrating a data center according to an embodiment.

Hereinafter, the embodiments of the disclosure will be described with reference to the accompanying drawings. In the explanation of FIGS. 1 to 18, the same reference numerals are used for substantially the same components, and repeated explanations of the components may not be provided for the sake of brevity. Also, similar reference numerals are used for similar components throughout the disclosure.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Herein, when a term "same" is used to compare a dimension of two or more elements, the term may cover a "substantially same" dimension.

It will be understood that, although the terms first, second, third, fourth etc. may be used herein to describe various elements, these elements should not be limited by these terms. These terms are only used to distinguish one element from another element. Thus, a first element discussed below could be termed a second element without departing from the teachings of the inventive concept.

FIG. 1 is a block diagram illustrating a data center according to an embodiment.

Referring to FIG. 1, a data center 10 is a facility that collects various data and provides services, and may also be referred to as a data storage center. The data center 10 may be a system for search engines and database operations, a computing system used by various companies such as banks or government agencies, and a distributed storage system. The data center 10 may include application servers 100 to 100n and storage servers 200 to 200m. The number of application servers 100 to 100n and the number of storage servers 200 to 200m may be variously selected depending on the embodiments, and the number of application servers 100 to 100n and storage servers 200 to 200m may be different from each other. The plurality of storage servers 200 to 200m may be included in a single cluster C and may be driven by each of the application servers 100 to 100n.

The application server 100 may include one or more processors 110 and one or more memory 120. The storage server 200 may include one or more processors 210 and one or more memories 220. Taking the storage server 200 as an example, the processor 210 may control the overall operation of the storage server 200. The specific operation of the processors 210 according to the one or more embodiments will be described below.

The processor 210 may access the memory 220 to execute commands and/or data loaded into the memory 220. The memory 220 may be a DDR SDRAM (Double Data Rate Synchronous DRAM), a HBM (High Bandwidth Memory), a HMC (Hybrid Memory Cube), a DIMM (Dual In-line Memory Module), an Optane DIMM or a NVM DIMM (Non-Volatile DIMM). Specific operations of the memories 220 according to the one or more embodiments will be described below.

The number of processors 210 and the number of memories 220 included in the storage server 200 may be variously selected. In an embodiment, the processor 210 and the memory 220 may provide a processor-memory pair. In an embodiment, the numbers of processors 210 and memories 220 may be different from each other. The processor 210 may include a single core processor or a multi-core processor. The description of the storage server 200 may also be similarly applied to the application server 100. Depending on the embodiments, the application server 100 may not include a storage device 150. The storage server 200 may include at least one or more storage devices 250. The number of storage devices 250 included in the storage server 200 may be variously selected depending on the embodiments.

The application servers 100 to 100n and the storage servers 200 to 200m may communicate with each other through a network 300. The network 300 may be implemented using a FC (Fiber Channel), an Ethernet, or the like. At this time, FC is a medium used for relatively high-speed data transfer, and an optical switch that provides high performance/high availability may be used. Depending on the access type of the network 300, the storage servers 200 to 200m may be provided as a file storage, a block storage or an object storage.

In an embodiment, the network 300 may be a storage-only network such as a SAN (Storage Area Network). For example, the SAN may be an FC-SAN which uses an FC network and is implemented according to FCP (FC Protocol). In another example, the SAN may be an IP-SAN which uses a TCP/IP network and is implemented according to iSCSI (Internet Small Computer Systems Interface) (or SCSI over TCP/IP or Internet SCSI) protocol. In another example, the network 300 may be a general network such as a TCP/IP network. For example, the network 300 may be implemented according to protocols such as a FCoE (Fiber Channel over Ethernet), a NAS (Network Attached Storage), and a NVMe-oF (NVMe over Fabrics).

Hereinafter, the application server 100 and the storage server 200 will be explained. The explanation of the application server 100 may also be applied to another application server 100n, and the explanation of the storage server 200 may also be applied to another storage server 200m.

The application server 100 may store data requested by a user or a client in one of the storage servers 200 to 200m through the network 300. Also, the application server 100 may obtain read data requested by the user or the client from one of the storage servers 200 to 200m through the network 300. For example, the application server 100 may be implemented as a Web server, a DBMS (Database Management System) or the like.

The application server 100 may operate as a host for the storage servers 200 to 200m and the like. The application server 100 may access the memory 120n or the storage device 150n included in another application server 100n through the network 300, and may access the memories 220 to 220m or the storage devices 250 to 250m included in the storage servers 200 to 200m through the network 300. Thus, the application server 100 may perform various operations on the data stored in the application servers 100 to 100n and/or the storage servers 200 to 200m. For example, the application server 100 may execute commands for moving or replicating data between the application servers 100 to 100n and/or the storage servers 200 to 200m. At this time, the data may be moved from the storage devices 250 to 250m of the storage servers 200 to 200m via the memories 200 to 200m of the storage servers 220 to 220m, or directly to the memories 120 to 120n of the application servers 100 to 100n. The data moved through the network 300 may be encrypted data for security and privacy.

Taking the storage server 200 as an example, an interface 254 may provide the physical connection between the processor 210 and a controller 251, and the physical connection between the NIC 240 and the controller 251. For example, the interface 254 may be implemented in a DAS (Direct Attached Storage) type in which the storage device 250 is directly connected with a dedicated cable. Also, for example, the interface 254 may be implemented as various interface types such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), a SD (secure digital) card, a MMC (multi-media card), an eMMC (embedded multi-media card), a UFS (Universal flush Storage), an eUFS (embedded Universal flush Storage), and a CF (compact flush) card interface.

The storage server 200 may further include a switch 230 and a network interface controller (NIC) 240. The switch 230 may selectively connect the processor 210 and the storage device 250 or may selectively connect the NIC 240 and the storage device 250, according to the control of the processor 210.

In an embodiment, the NIC 240 may include a network interface card, a network adapter, and the like. The NIC 240 may be connected to the network 300 by a wired interface, a wireless interface, a Bluetooth interface, an optical interface, or the like. The NIC 240 may include an internal memory, a digital signal processor (DSP), a host bus interface, or the like, and may be connected to the processor 210 and/or the switch 230, or the like through the host bus interface. The host bus interface may also be implemented as one of the examples of the aforementioned interface 254. In an embodiment, the NIC 240 may also be integrated with at least one of the processor 210, the switch 230, and the storage device 250.

In the storage servers 200 to 200m and/or the application servers 100 to 100n, the processors 110 to 110n and/or the processors 210 to 210m may transmit commands to the storage devices 150 to 150n and storage devices 250 to 250m, respectively. Also, the processors 110 to 110n and/or the processors 210 to 210m may transmit commands to the memories 120 to 120n and the memories 220 to 220m, respectively, to program or read the data. However, the one or more embodiments are not limited thereto, and the processors 110 to 110n may transmit commands to the storage devices 250 to 250m and the processors 210 to 210m may transmit commands to the storage devices 150 to 150n. Similarly, the processors 110 to 110n may transmit commands to the memories 220 to 220m and the processors 210 to 210m may transmit commands to the memories 120 to 120n. Moreover, the data may be data in which error is corrected through an ECC (Error Correction Code) engine. The data may be subjected to data bus inversion (DBI) or data masking (DM) processing, and may include CRC (Cyclic Redundancy Code) information. The data may be encrypted data for security and privacy.

The storage devices 150 to 150m and the storage devices 250 to 250m may transmit control signals and command/address signals to NAND flash memory devices 252 to 252m in response to the read commands received from the one or more processors. Accordingly, when reading the data from the NAND flash memory devices 252 to 252m, the RE (Read Enable) signal may be input as the data output control signal and serve to output the data to the DQ bus. The RE signal may be used to generate DQS (Data Strobe). Command and address signals may be latched into the page buffer, depending on a rising edge or a falling edge of WE (Write Enable) signal.

The controller 251 may generally control the operation of the storage device 250. In an embodiment, the controller 251 may include a SRAM (Static Random Access Memory). The controller 251 may write data to the NAND flash memory device 252 in response to a write command, or may read data from the NAND flash memory device 252 in response to a read command. For example, the write command and/or the read command may be provided from the processor 210 in the storage server 200, the processor 210m in another storage server 200m, or the processors 110 to 110n in the application servers 100 to 100n. The dynamic random access memory (DRAM) 253 may temporarily store (buffer) the data to be written to the NAND flash memory device 252 or data that is read from the NAND flash memory device 252. Also, the DRAM 253 may also store metadata. Here, the metadata is data for managing the user data or the NAND flash 252.

The storage device 250 may include a secure element (SE) for security and privacy. The storage device 250 may perform database functions of the storage data stored in the data center 10a.

Figure 2:
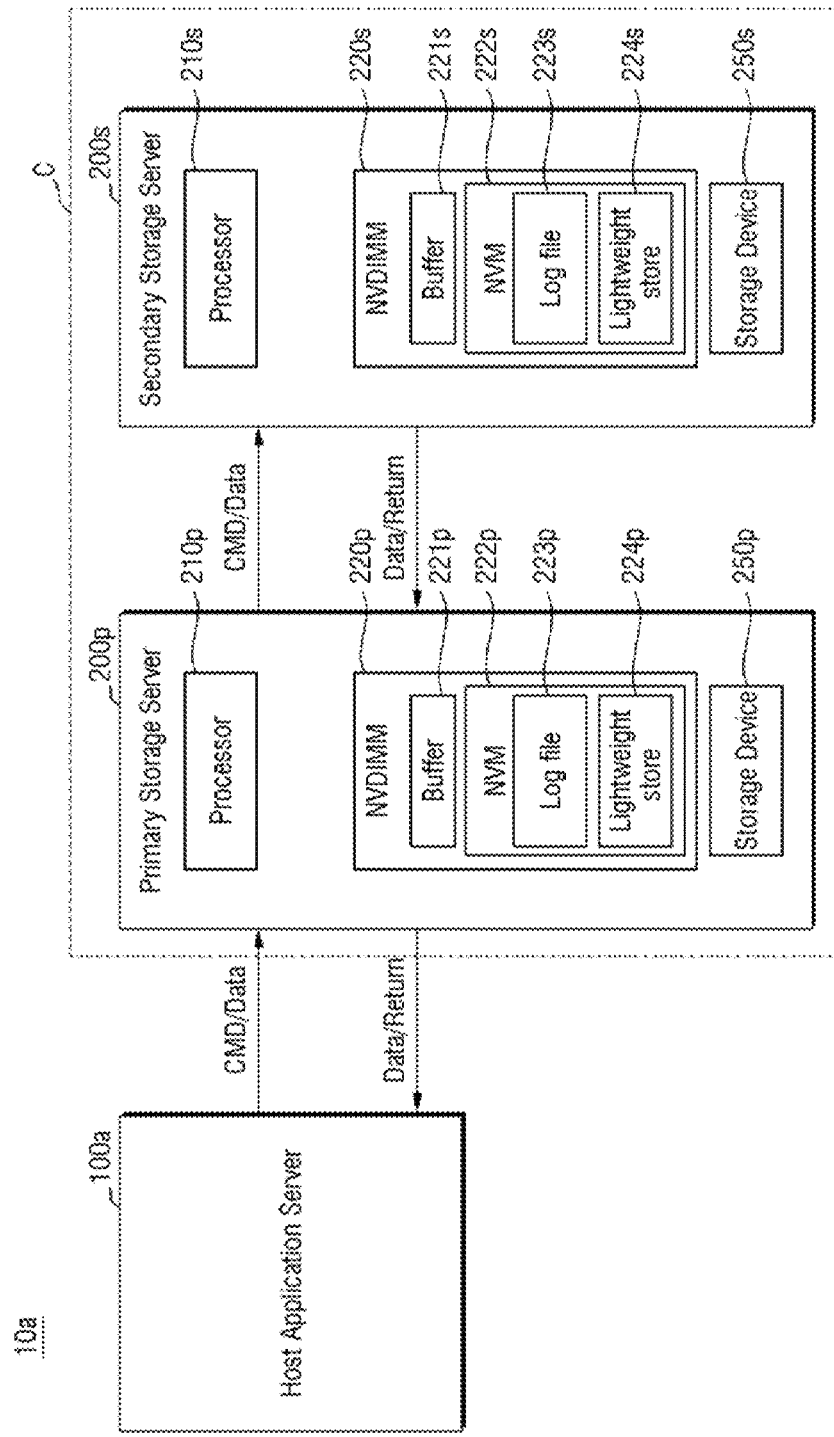
FIG. 2 is a block diagram illustrating a storage server according to an embodiment.

FIG. 2 is a block diagram illustrating storage servers 200p and 200s according to an embodiment.

A data center 10a according to an embodiment includes a host application server 100a, a first storage server 200p, and a second storage server 200s.

The host application server 100a may provide the command (CMD) together with the data (Data) to the storage server 200p through the network (300, see FIG. 1) based on the data requested to be stored by the user or client. The host application server 100a may correspond to at least one of the application servers 100 to 100n of FIG. 1.

The first storage server 200p may include a first processor 210p, a first non-volatile dual in-line memory module (NVDIMM) 220p, and a first storage device 250p. The second storage server 200s may include a first processor 210s, a second NVDIMM 220s, and a second storage device 250s.

In some embodiments, the first storage server 200p and the second storage server 200s correspond to the storage servers 200 to 200m of FIG. 1. The first processor 210p and the second processor 210s may correspond to the processors 210 to 210m of FIG. 1, the first NVDIMM 220p and the second NVDIMM 220s may correspond to the memories 220 to 220m of FIG. 1, and the first storage device 250p and the second storage device 250s may correspond to the storage devices 250 to 250m of FIG. 1. The first storage server 200p and the second storage server 200s may include the same configuration. Also, the second storage server 200s may be a storage server subsequent to the first storage server 200p from the viewpoint of the host application server 100a. However, the one or more embodiments are not limited thereto.

The first processor 210p receives data (Data), a command (CMD) of the data (Data) from the host application server 100a. The first processor 210p may generate an additional command (CMD) in response to the command (CMD) and provide the additional command (CMD) to an external device, for example, the second storage server 200s. The first processor 210p may also generate a return signal (Return) and provide the return signal (Return) to the host application server 100a.

The first NVDIMM 220p may include a first buffer 221p and a first non-volatile memory (NVM) device 222p. The first non-volatile memory device 222p may store and load a first log file 223p and a first firmware 224p to execute programs on the first log file 223p and the first firmware 224p. The first non-volatile memory device 222p may be an EEPROM (Electrically Erasable Programmable Read-Only Memory), a flash memory, an MRAM (Magnetic RAM), a pin transfer torque MRAM (Spin-Transfer Torque MRAM), a FeRAM (Ferroelectric RAM), a PRAM (Phase change RAM) or a Resistive RAM (RRAM).

The first buffer 221p may operate as a re-driving buffer, and re-drive signals/commands input from the first processor 210p to provide re-driven signals/commands to the first non-volatile memory device 222p in the first NVDIMM 220p.

The command of the first storage device 250p may be logged in the first log file 223p. The first firmware 224p allows the first processor 210p to provide a multi-offset write command to the storage device 250p based on the first log files 223p. In addition, the first firmware 224p is software that provides commands for the operation to the first storage device 250p through the first processor 210p.

The first storage device 250p may receive commands from the first processor 210p and perform read/write operations according to the provided commands. The types of data programmed in the first storage device 250p may be data which may be programmed by the storage device, such as metadata and allocator of the data (Data) together with data (Data) input from the outside, and the examples of data types do not limit the technical ideas of the present disclosure.

Figure 3:
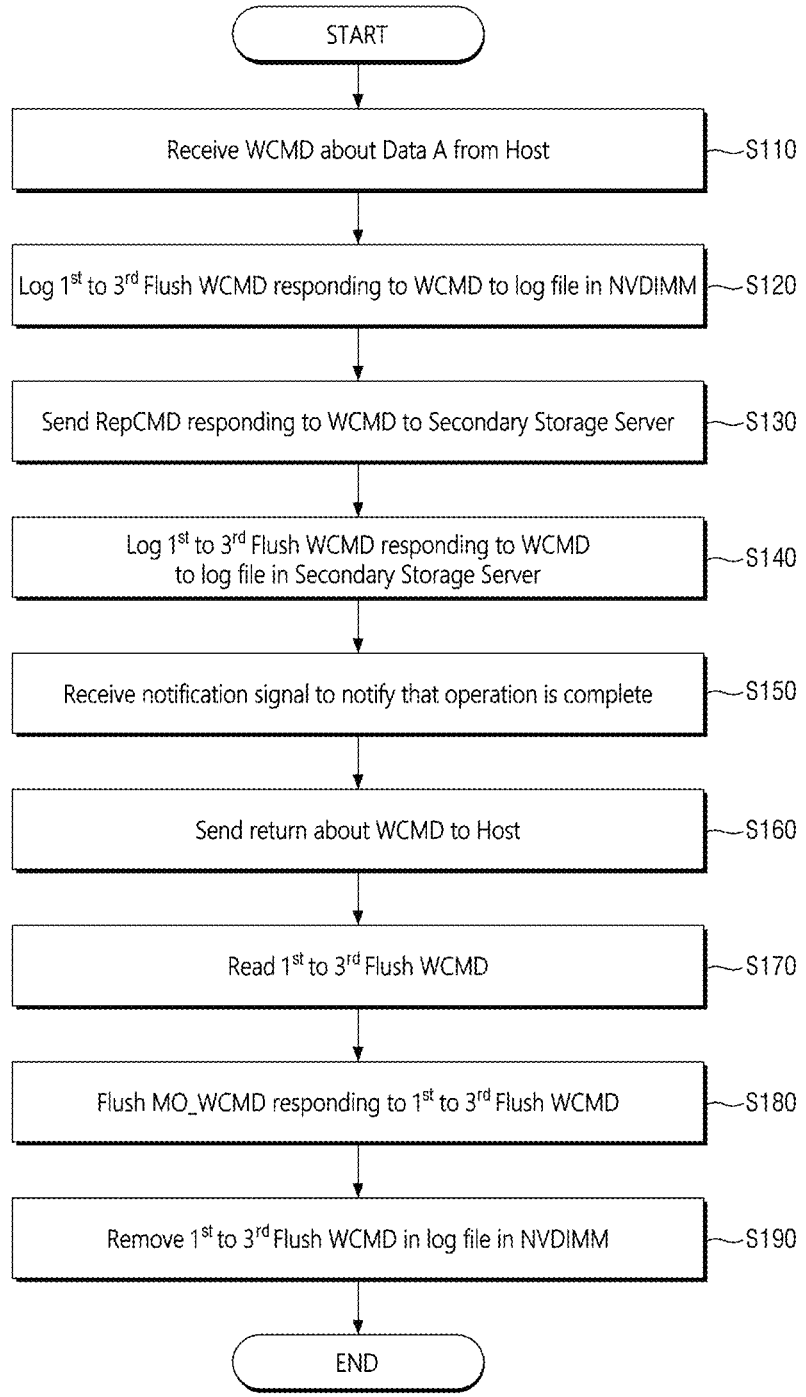
FIG. 3 is a flowchart illustrating operations of a storage server according to an embodiment.
Figure 4:
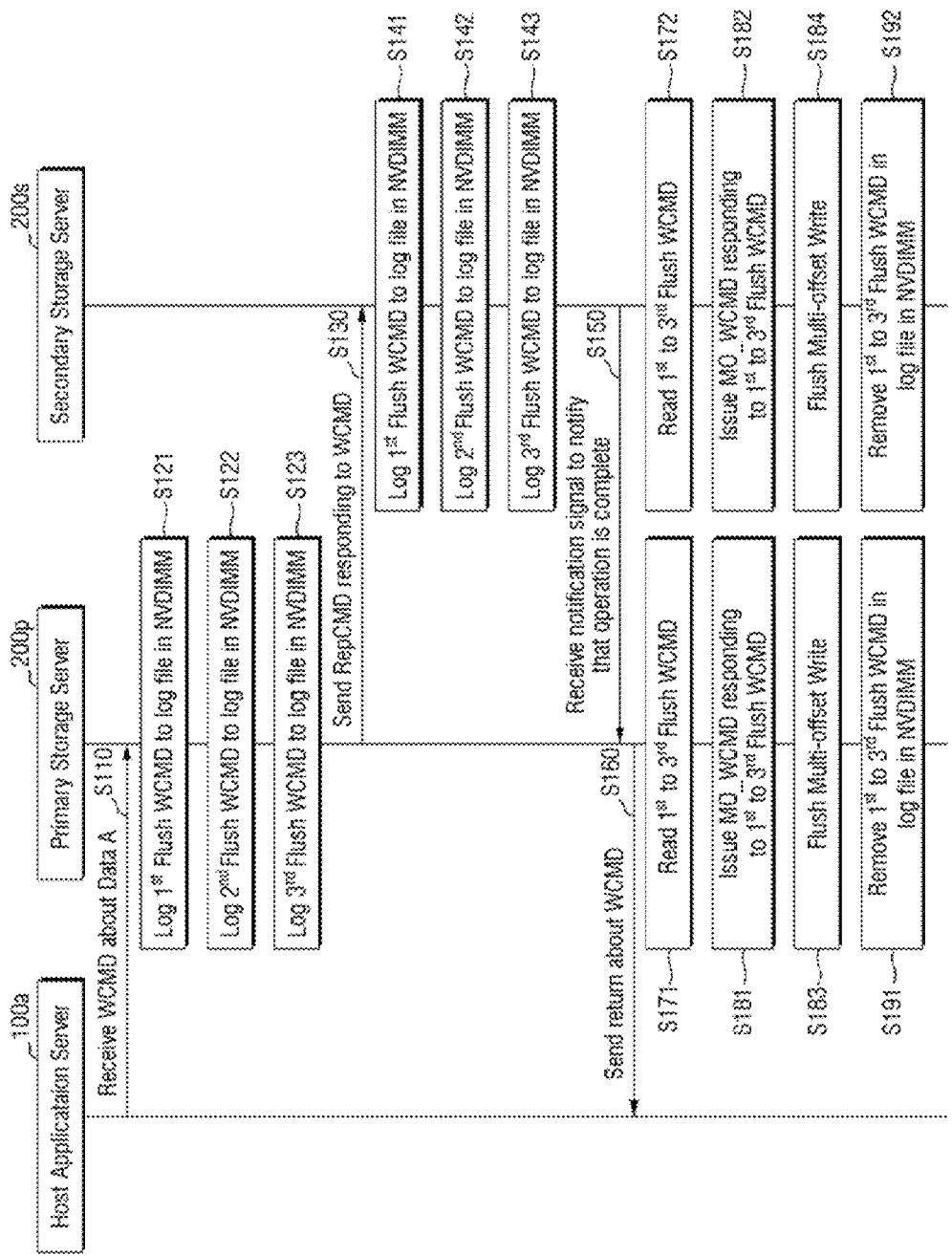
FIG. 4 is a ladder diagram illustrating operations of a data center according to an embodiment.

FIG. 3 is a flowchart illustrating operations of the storage server according to an embodiment. FIG. 4 is a ladder diagram illustrating operations of the data center according to an embodiment. FIGS. 5 to 13 are diagrams for explaining operations of the storage server according to various embodiments.

Figure 5:
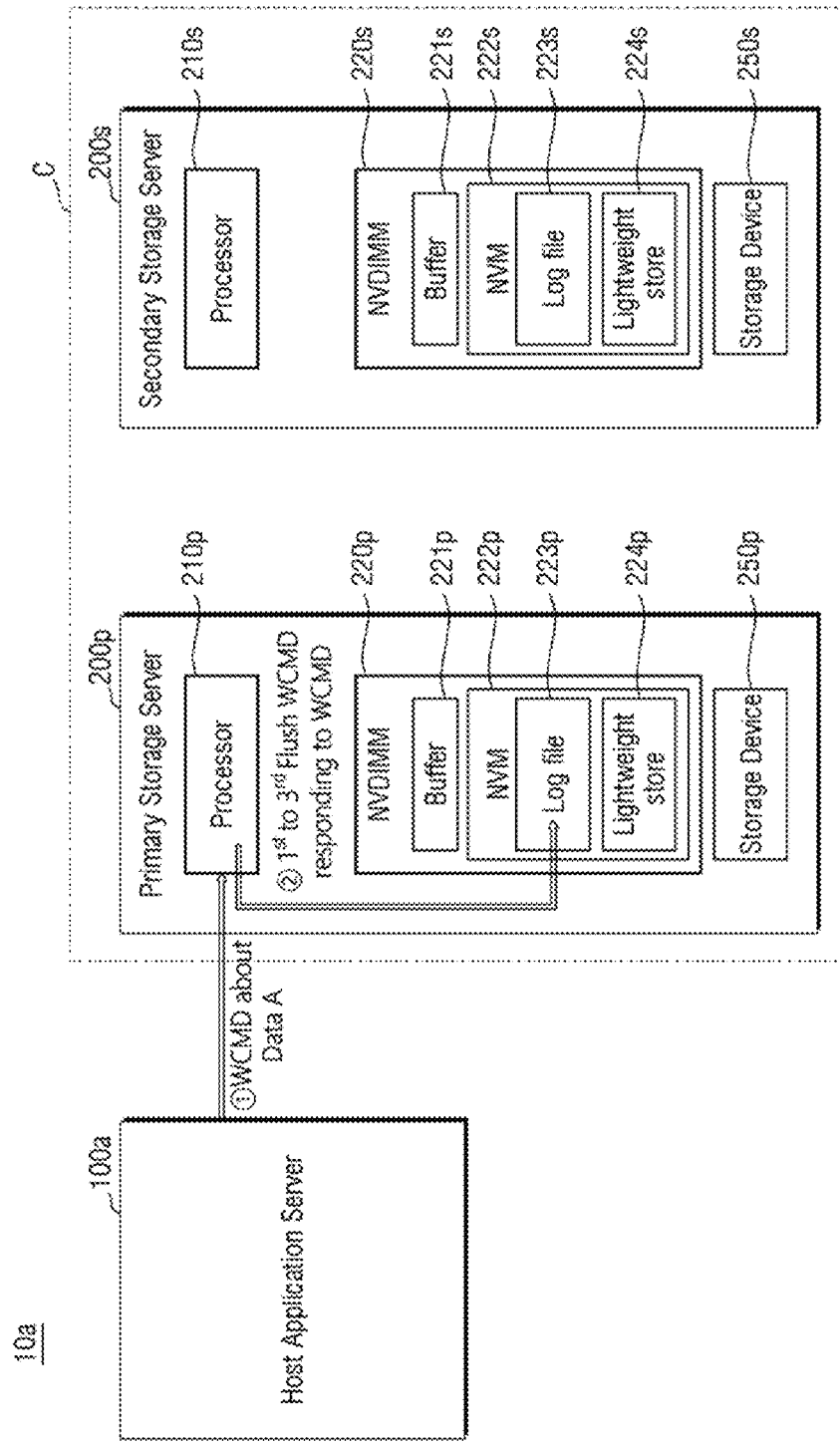

Referring to FIGS. 3 to 5, the first processor 210p of the first storage device 200p receives a write command (WCMD) for the first data (Data A) from the host application server 100a (S110).

The first processor 210p receives the write command (WCMD) of the first data (Data A), and logs the first to third flush write commands ($1^{st}$ flush WCMD to $3^{rd}$ flush WCMD) of the write command (WCMD) to the first log file 223p (S120 in FIG. 3).

Figure 6:
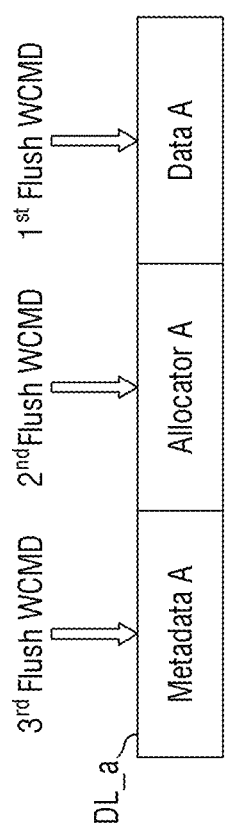

Further referring to FIG. 6, a first flush write command ($1^{st}$ flush WCMD) is a write command for the first data (Data A). The first data (Data A) is data requested by the host to write in the first data layout (DL_a).

A second flush write command ($2^{nd}$ flush WCMD) is a write command of the first allocator (Allocator A) of the first data (Data A). A third flush write command ($3^{rd}$ flush WCMD) is a write command for the first metadata (Metadata A) of the first data (Data A). A first allocator (Allocator A) is data for implementing the resource allocation of the first data (Data A). A first metadata (Metadata A) is data for managing the first data (Data A).

The first processor 210p logs the first flush write command ($1^{st}$ flush WCMD) to the first log file 223p (S121 in FIG. 4), logs the second flush write command ($2^{nd}$ flush WCMD) to the first log file 223p (S122 in FIG. 4), and logs the third flush write command ($3^{rd}$ flush WCMD) to the first log file 223p (S123 in FIG. 4). The sequence of the log operations described above is an example for explaining the operations of the one or more first storage servers. However, the one or more embodiments are not limited to the above-described sequence, and the sequence of log operations may vary according to various implementations of the storage server.

Figure 7:
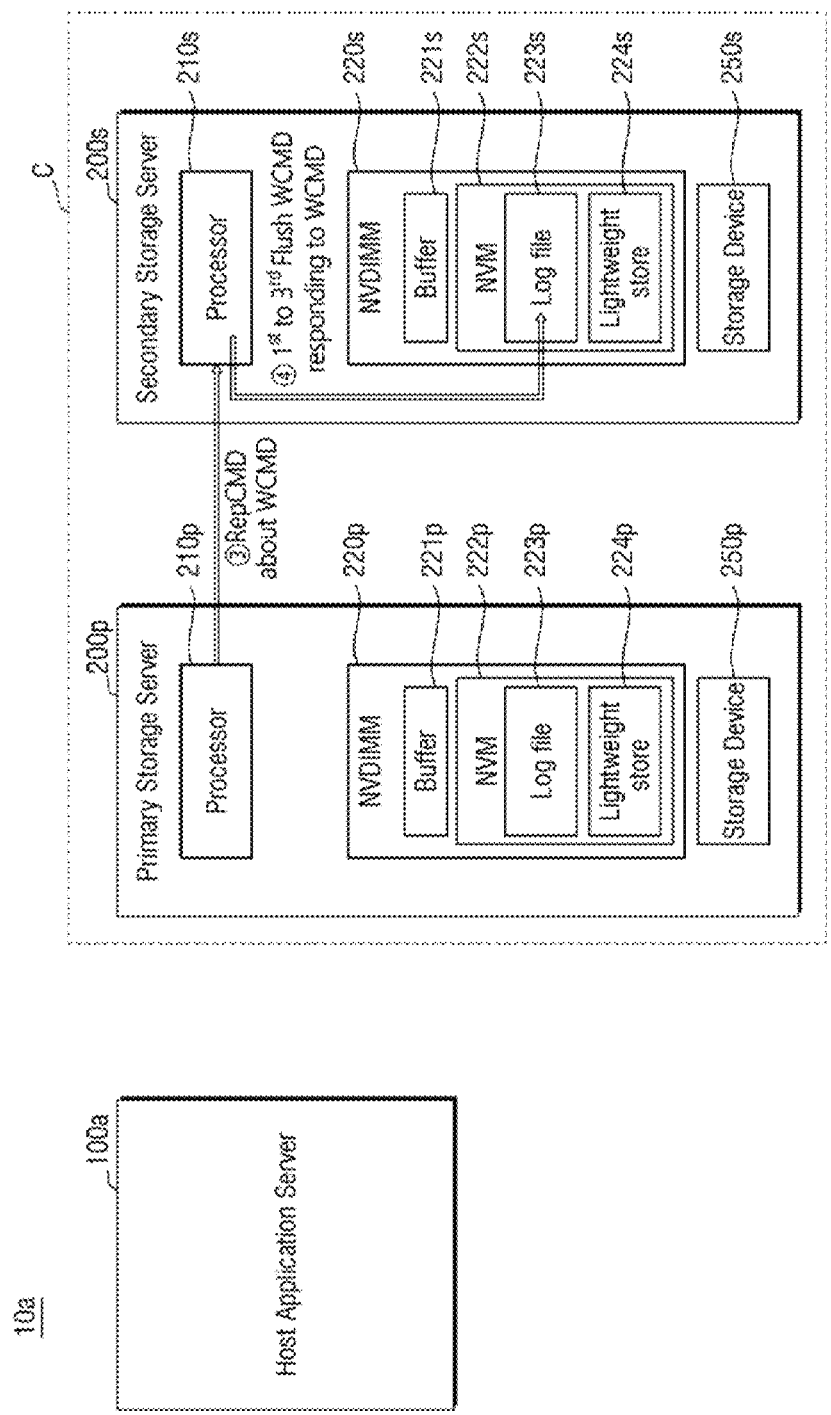

Further, referring to FIG. 7, the first processor 210p provides a replication command (RepCMD) of the write command (WCMD) to the second storage server 200s after the log operation (S120 in FIG. 3) of the first log file 223p is completed (S130 in FIG. 3).

The second processor 210s receives the replication command (RepCMD) of the first data (Data A), and logs the first to third flush write commands ($1^{st}$ flush WCMD to $3^{rd}$ flush WCMD) of the replication command (RepCMD) to the second log file 223s (S140). Depending on the embodiments, the first to third flush write commands ($1^{st}$ flush WCMD to $3^{rd}$ flush WCMD) may be the same as the first to third flush write commands ($1^{st}$ flush WCMD to $3^{rd}$ flush WCMD) logged to the first log file 223p.

The second processor 210s logs the first flush write command ($1^{st}$ flush WCMD) to the second log file 223s (S141 in FIG. 4), logs the second flush write command ($2^{nd}$ flush WCMD) to the second log file 223s (S142 in FIG. 4), and logs the third flush write command ($3^{rd}$ flush WCMD) to the second log file 223s (S143 in FIG. 4). The sequence of the log operations described above is an example for explaining operations of the one or more second storage servers. However, the one or more embodiments are not limited thereto, and the sequence of log operations may vary according to various implementations of the storage server.

Figure 8:
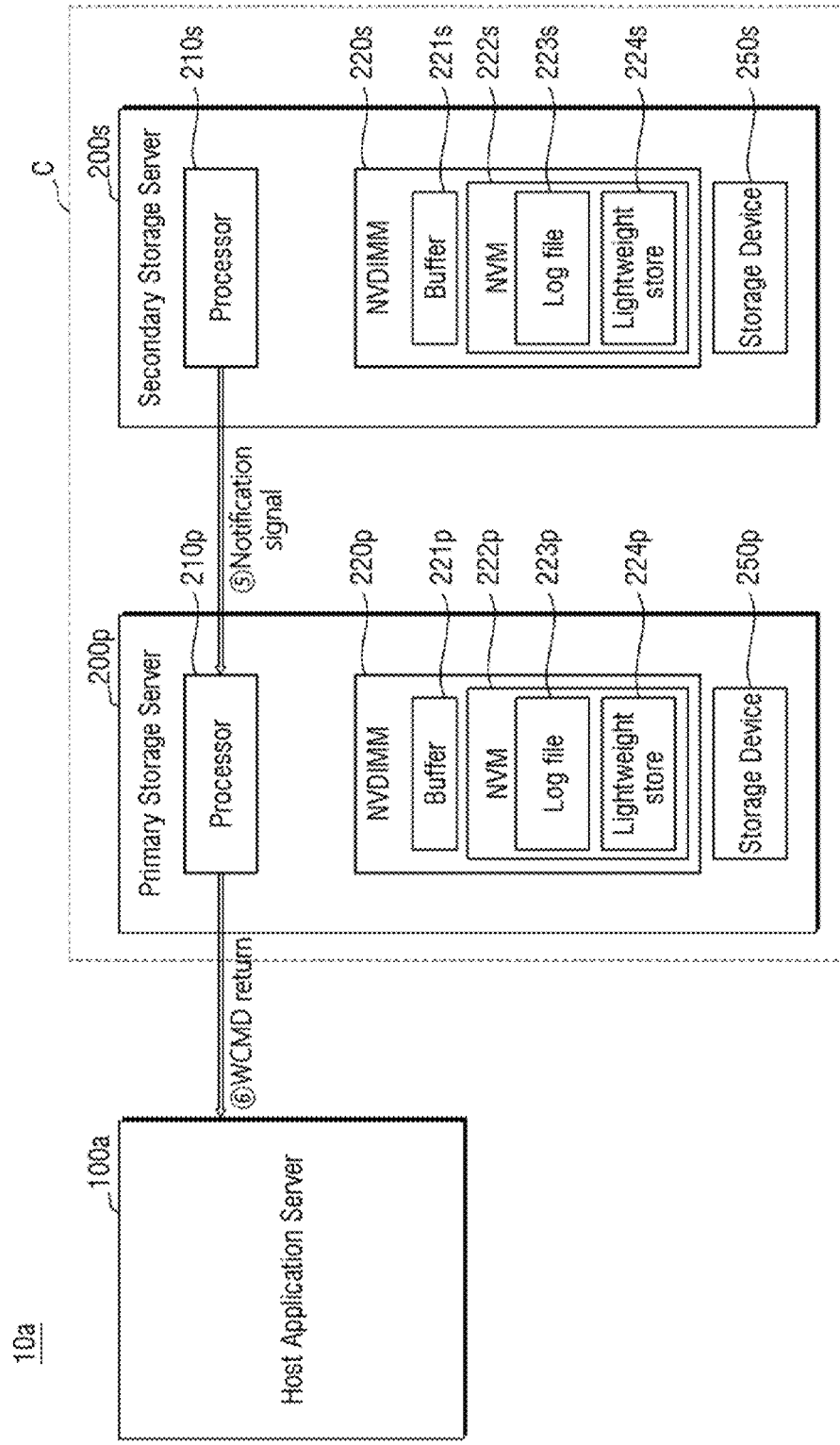

Further, referring to FIGS. 7 and 8, the second processor 210s provides an operation completion signal (notification signal) of the replication command (RepCMD) to the first storage server 200p after the log operation (S140 in FIG. 3) for the second log file 223s is completed. (S150 in FIG. 3).

The operation completion signal (notification signal) of the second processor 210s according to some embodiments may mean that the operation of the replication command (RepCMD) provided by the first storage server 200p is completed, and this may be a return signal of the first storage server 200p. Specifically, the second processor 210s may generate the operation completion signal (notification signal) in response to the replication command (RepCMD) received from the first processor 210p of the first storage server 200p (shown in FIG. 7), and transmit or return the generated operation completion signal to the first storage server 200p (shown in FIG. 8).

The first processor 210p provides the return signal of the write command (WCMD) to the host application server 100a after receiving the operation completion signal (notification signal) (S160 in FIG. 3). The return signal of the write command (WCMD) may mean that the operation of the write command (WCMD) provided by the host application server 100a is completed.

Figure 9:
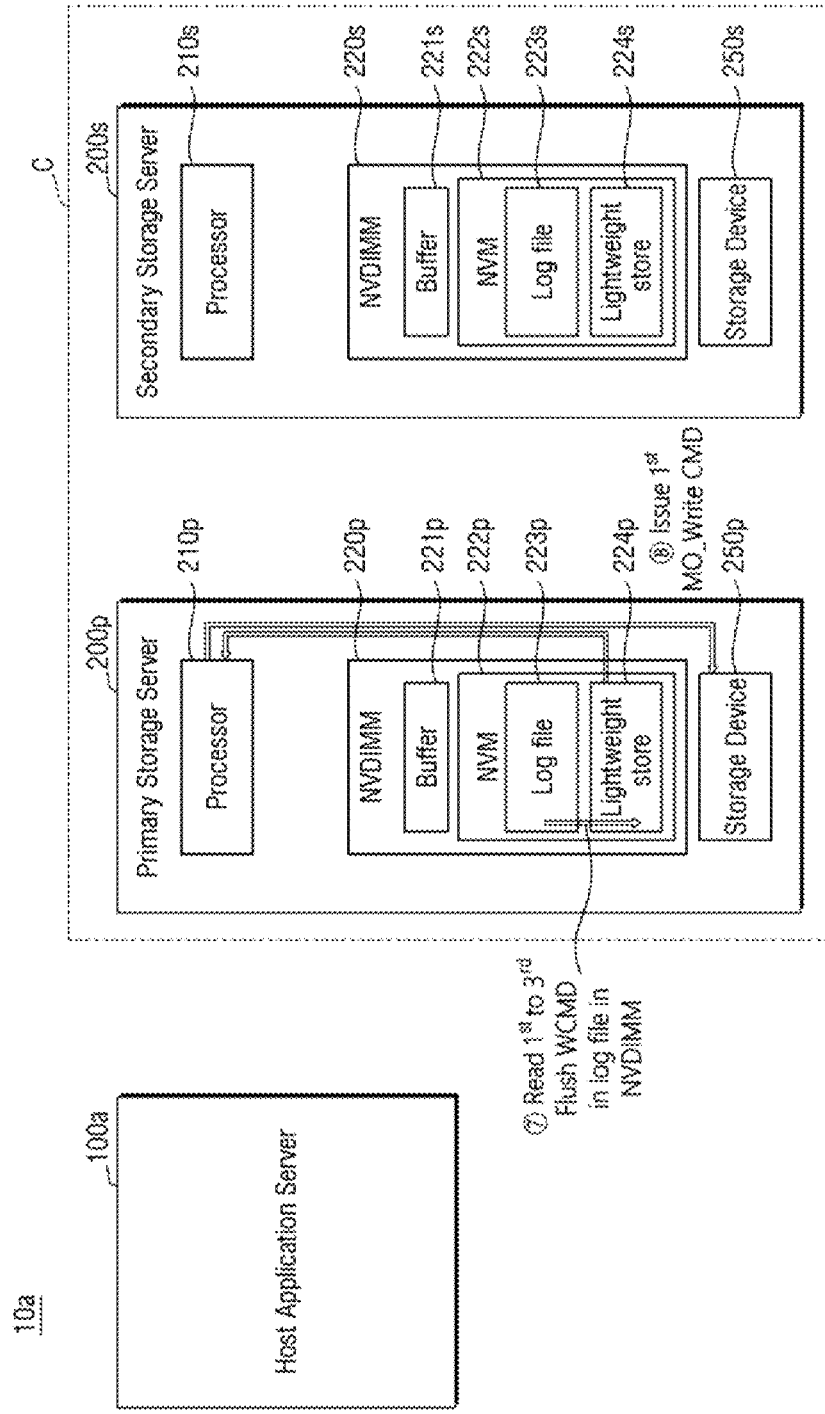

Referring to FIGS. 9 and 10, the first firmware 224p reads the commands logged to the first log file 223p (S170 in FIG. 3). The multi-offset write command corresponding to the read command is executed, and the flush operation corresponding to the multi-offset write command is performed on the first storage device 250p (S180 in FIG. 3).

In the first multi-offset write command of the first log file 223p, the first data (Data A), the first allocator (Allocator A), and the first metadata (Metadata A) of FIG. 6 corresponding to the write command (WCMD) are logged.

Log sequence number (LSN), type of operations, logical address (address), and data may be logged in relation to the logged commands. According to some embodiments, the log sequence number (LSN) may mean the sequence of the commands logged to the first log file 223p and may be executed by the index function of the command depending on the embodiments.

The types of operation of the logged command include an input (Insert), a change (Update), and a delete (Delete), and the types of operations may be diversified depending on the embodiments. The first to third write commands ($1^{st}$ Flush WCMD to $3^{rd}$ Flush WCMD) of the disclosure may correspond to an input or change operation.

The logical address in which the data on which the command is executed is stored may be input to the logical address (address), and each command may be logged to the logical page number LPN, depending on the embodiments. As an example, the first data (Data A) and the first logical page number (LPNa) are logged together, the first allocator (Allocator A) and the second logical page number (LPNb) are logged together, the first metadata (Metadata A) and a c-th logical page number (LPNc) are logged together.

In FIG. 10, although each command is input in a separate logical page number (LPN) unit, the embodiment may be changed so that data in one logical page number (LPN) unit may be programmed for the plurality of commands.

The first firmware 224p may control the first processor 210p to issue a single first multi-offset write command ($1^{st}$ MO_WCMD) for the command corresponding to the first to sixteenth log sequence numbers (LSN1 to LSN16). However, the number of commands logged to only issue the multi-offset write command may vary depending on the embodiment, and if the number of commands logged is greater than or equal to a preset threshold value, the multi-offset write command may be issued (S181 in FIG. 4).

The first multi-offset write command ($1^{st}$ MO_WCMD) may be issued based on the first data (Data A), the first allocator (Allocator A), and the first metadata (Metadata A) of FIG. 6 corresponding to the write command WCMD, and provided to the first storage device 250p.

FIG. 11 is a diagram for explaining the operation of a storage device according to another embodiment that is different from the embodiment of FIG. 10. Referring to FIG. 11, regardless of the number of commands logged to issue the multi-offset write command, the first firmware 224p may control the first processor 210p to issue the second multi-offset write command ($2^{nd}$ MO_WCMD) after a predetermined threshold time T elapses after issuance of the previous multi-offset write command or reception of the write command (WCMD) (S181 in FIG. 4).

Unlike FIG. 10, the first firmware 224p controls the first processor 210p to issue a single second multi-offset write command ($2^{nd}$ MO_WCMD) for the command corresponding to the first to twelfth log sequence numbers (LSN1 to LSN12), and the first processor 210p issues the multi-offset write command on the basis of the first data (Data A) and the first allocator (Allocator A) of FIG. 6.

Figure 12:
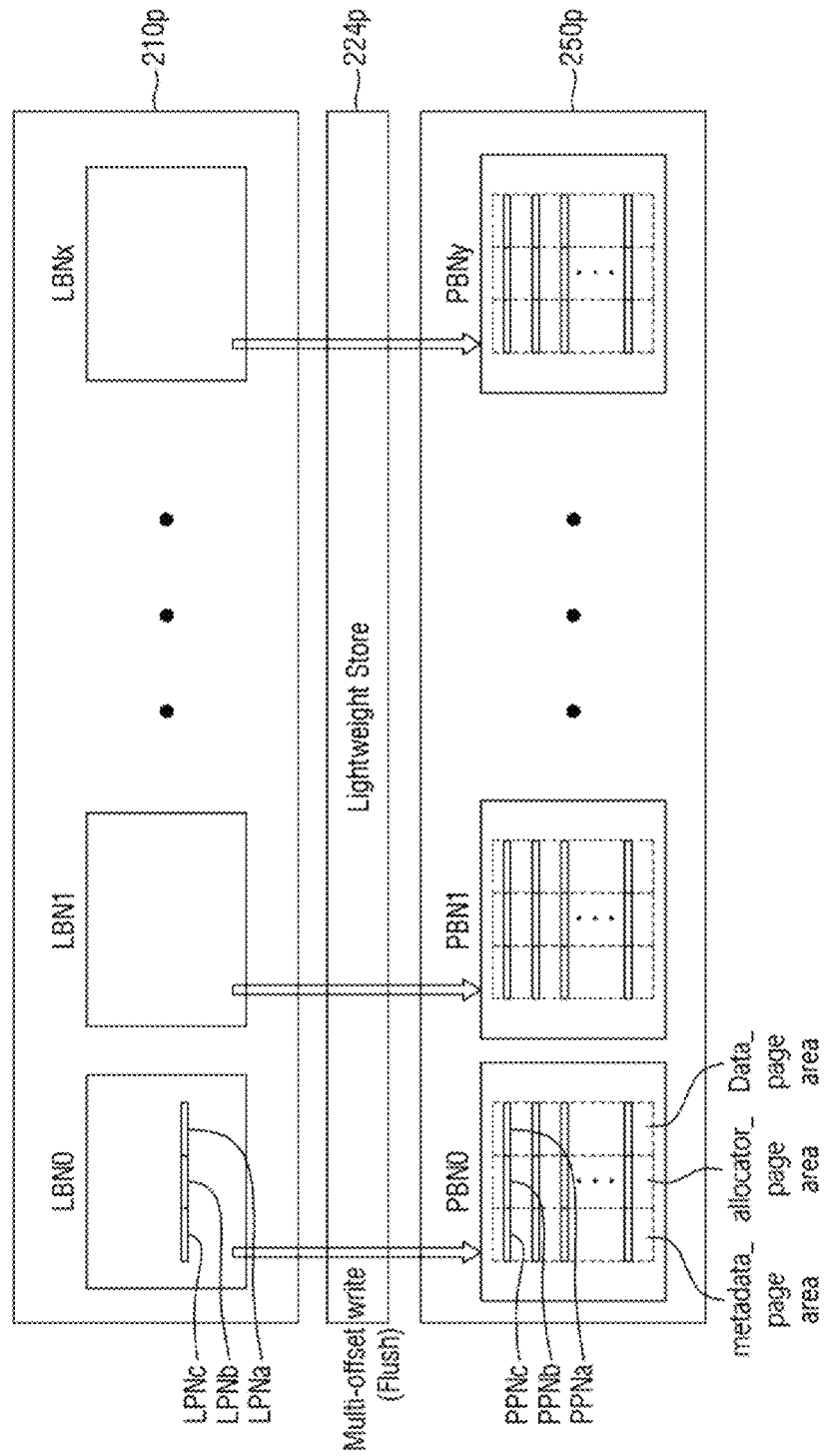

Referring to FIG. 12, the first firmware 224p may provide a first multi-offset write command ($1^{st}$ MO_WCMD) together with the logical address to the first storage device 250p. The first storage unit 250p performs a flush operation on the multi-offset write command based on the provided logical address (S183 in FIG. 4).

The flush operation (S183 in FIG. 4) of the first storage device 250p performs the operation of the first to third flush write commands ($1^{st}$ Flush WCMD to $3^{rd}$ Flush WCMD) corresponding to the first multi-offset write command ($1^{st}$ MO_WCMD) at the same time.

The first storage device 250p according to some embodiments may not update the mapping information for associating the logical address with the physical address to efficiently execute the multi-offset write command. As an example, the program of the first data (Data A, see FIG. 10) of the a-th logical page number (LPNa) is executed at the a-th physical page number (PPNa), and thereafter, if there is no request to update the mapping information of the first processor 210p or the first firmware 224p, the mapping information of the a-th logical page number (LPNa) and the a-th physical page number (PPNa) is not updated.

Similarly, the program of the first allocator (Allocator A, see FIG. 10) of the b-th logical page number (LPNb) is performed at the b-th physical page number (PPNb), and thereafter, if there is no request to update the mapping information of the first processor 210p or the first firmware 224p, the mapping information of the b-th logical page number (LPNb) and the b-th physical page number (PPNb) is not updated.

Similarly, the program of the first metadata (Metadata A, see FIG. 10) of the c-th logical page number (LPNc) is performed at the c-th physical page number (PPNc), and thereafter, if there is no request to update the mapping information of the first processor 210p or the first firmware 224p, the mapping information the c-th logical page number (LPNc) and the c-th physical page number (PPNc) is not updated.

Therefore, mapping information of the physical address (LBN0 to LBNx) and the physical address of the first storage device (PBN0 to PBNy) that may be processed by the first processor 210p in the first storage server 200p according to some embodiments may not be updated unless there is another request.

In the first storage device 250p according to some embodiments, the a-th physical page number (PPNa) may be placed in the data page area in the first storage device 250p, the b-th physical page number (PPNb) may be placed in the allocator page area in the first storage device 250p, and the c-th physical page number (PPNc) may be placed in the metadata page area in the first storage device 250p.

Figure 13:
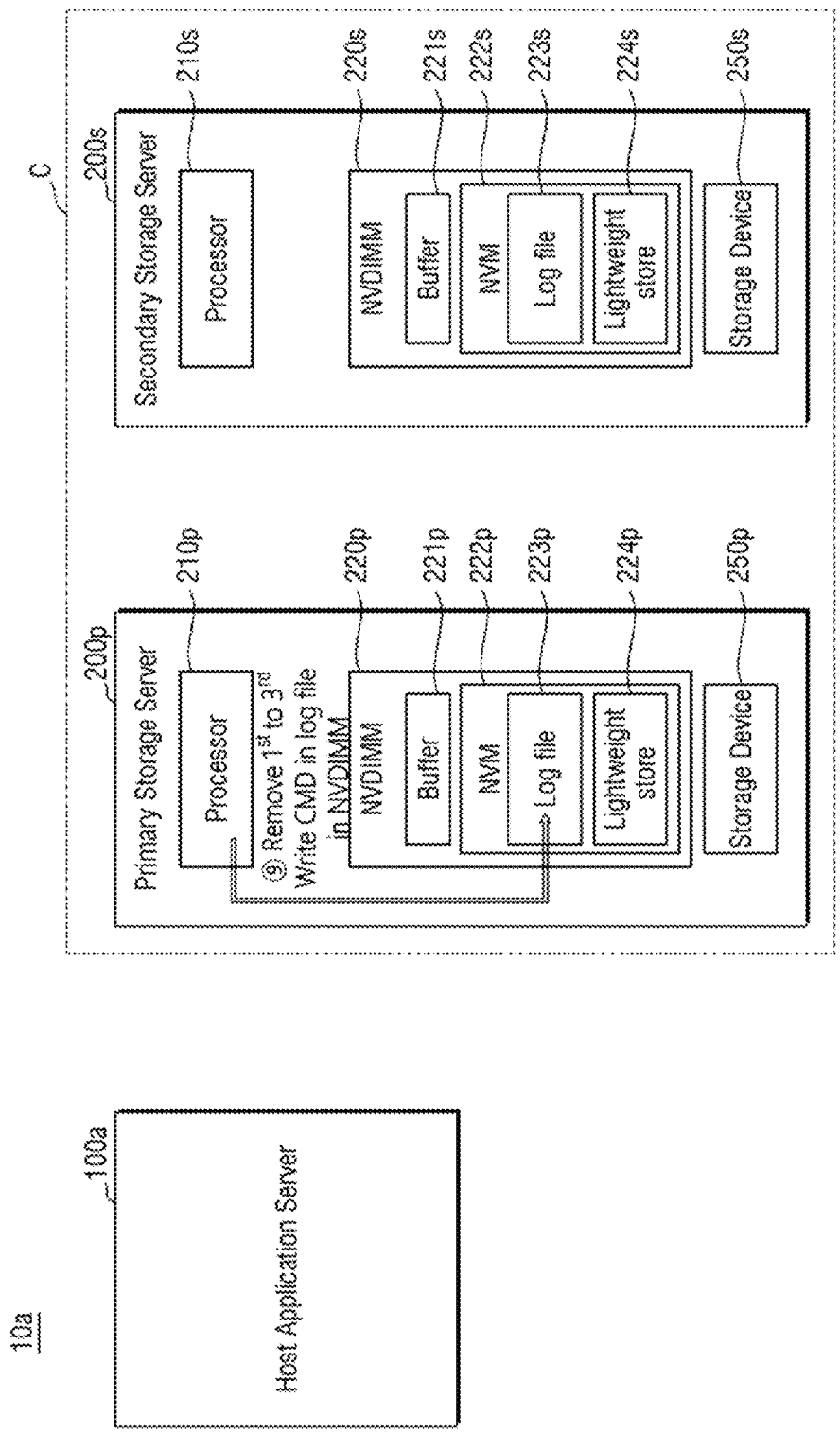

Further, referring to FIG. 13, the processor removes the log of the command corresponding to the multi-offset write command from the log file (S190 in FIG. 3). The first processor 210p removes the log of the first to third flush write commands ($1^{st}$ Flush WCMD to $3^{rd}$ Flush WCMD) corresponding to the first multi-offset write command ($1^{st}$ MO_WCMD) from the first log file 223p (S191 in FIG. 4).

In FIGS. 9 to 13, the read operation (S171 in FIG. 4) of the first firmware 210p, the issuance (S181) of the multi-offset write command (MO_WCMD), the flush operation (S183 in FIG. 4) of the first storage device 250p, and the removal operation (S191 in FIG. 4) of the first log file 223p are shown. However, the read operation (S172 in FIG. 4) of the second firmware 210s, issuance (S182 in FIG. 4) of the multi-offset write command (MO_WCMD), flush operation (S184 in FIG. 4) of the second storage device 250s, and removal operation (S192 in FIG. 4) of the second log file 223s are performed in the second storage server 210s, while corresponding to the operation of the first storage server 210p.

Therefore, the read operation (S172 in FIG. 4) of the second firmware 210s, the issuance (S182 in FIG. 4) of the multi-offset write command (MO_WCMD), the flush operation (S184 in FIG. 4) of the second storage device 250s, and the removal operation (S192 in FIG. 4) of the second log file 223s in the second storage server 210s may be the same as the operations of the first storage server 210p.

However, the read operation (S172 in FIG. 4) of each second firmware 210s, the issuance (S182 in FIG. 4) of the multi-offset write command (MO_WCMD), the flush operation (S184 in FIG. 4) of the second storage device 250s, and the removal operation (S192 in FIG. 4) of the second log file 223s may be performed independently of the read operation (S171 in FIG. 4) of each first firmware 210p, the issuance (S181 in FIG. 4) of the multi-offset write command (MO_WCMD), the flush operation (S183 in FIG. 4) of the first storage device 250p, and the removal operation (S191 in FIG. 4) of the first log file 223p.

Figure 14:
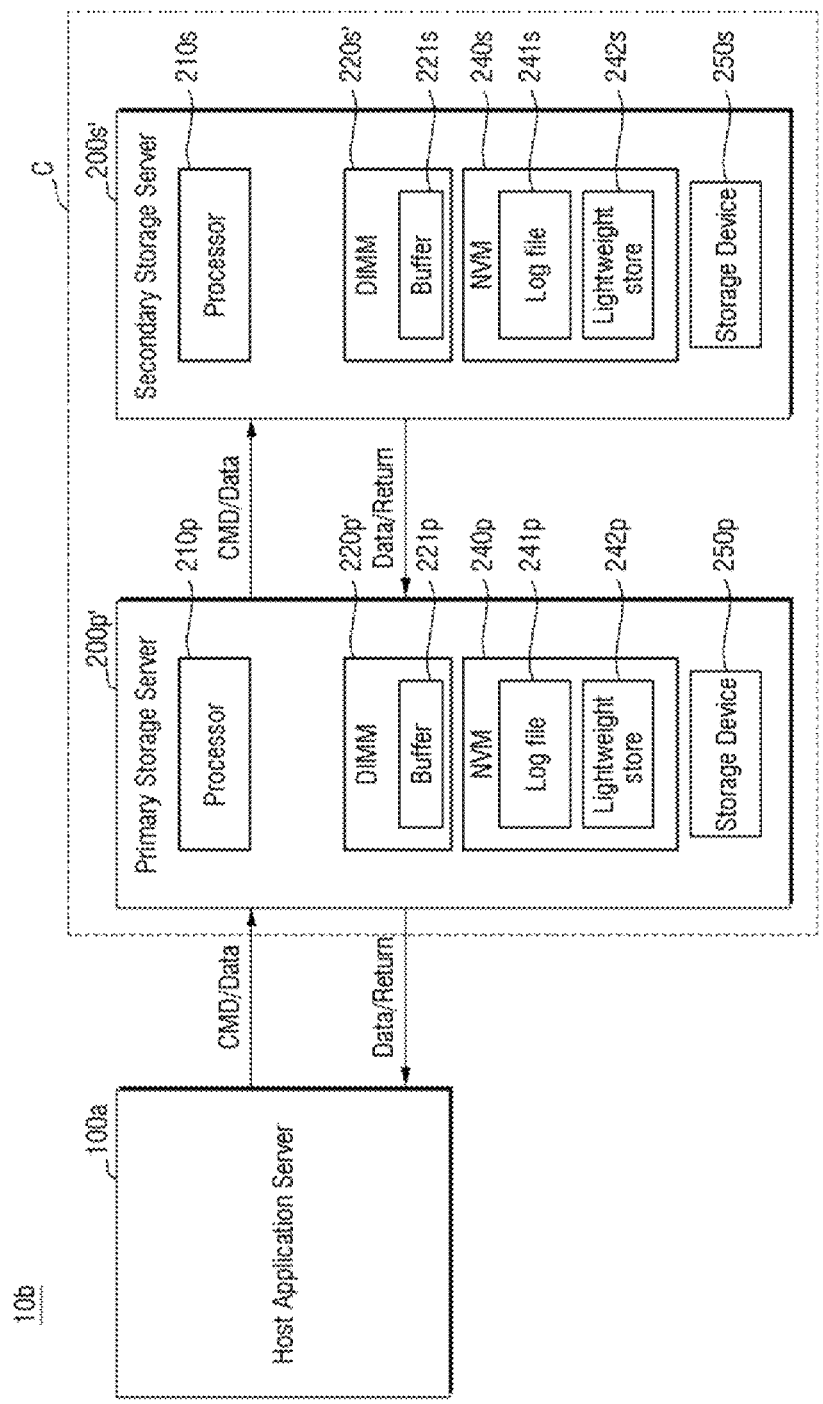
FIG. 14 is a block diagram illustrating a storage server in a data center according to an embodiment.

FIG. 14 is a block diagram for explaining storage servers 220p' and 220s' of the data center 10b according to an embodiment.

Hereinafter, the storage servers 200p' and 200s' in the data center 10b according to an embodiment will be described referring to FIG. 14. The differences from the storage servers 200p and 200s shown in FIG. 2 will be mainly explained.

The first storage server 200p' includes a first DIMM 220p', and a first non-volatile memory device 240p separated from the first DIMM 220p'. The first DIMM 220p' includes a volatile memory, and the volatile memory may be a RAM (random access memory), a DRAM (dynamic RAM), a SRAM (static RAM), a T-RAM (thyristor RAM), a Z-RAM (zero capacitor RAM) and/or a TTRAM (Twin Transistor RAM).

The first log file 241p and the first firmware 242p is loaded to the first DIMM 220p', and a program of the first log file 241p and the first firmware 242p may be executed. The first DIMM 220p' may correspond to the first NVDIMM 220p of FIG. 2.

The first non-volatile memory device 240p may be an EEPROM (Electrically Erasable Programmable Read-Only Memory), a flash memory, a MRAM (Magnetic RAM), a pin transfer torque MRAM (Spin-Transfer Torque MRAM), a FeRAM (Ferroelectric RAM), a PRAM (Phase change RAM) or a Resistive RAM (RRAM).

The first non-volatile memory device 240p stores the first log file 241p and the first firmware 242p. The first log file 241p and the first firmware 242p stored in the first non-volatile memory device 240p may be loaded onto the first DIMM 220p'. The first non-volatile memory device 240p may correspond to the first non-volatile memory device 222p of FIG. 2 in terms of storing the first log file 241p and the first firmware 242p.

The second storage server 200s' includes a second DIMM 220s', and a second non-volatile memory device 240s separated from the second DIMM 220s'. The second DIMM 220s' and the second non-volatile memory device 240s may correspond to the first DIMM 220p' and the first non-volatile memory device 240p, respectively. Therefore, it is obvious that the explanation of the second DIMM 220s' and the second non-volatile memory device 240s is replaced with the explanation of the first DIMM 220p' and the first non-volatile memory device 240p.

Figure 15:
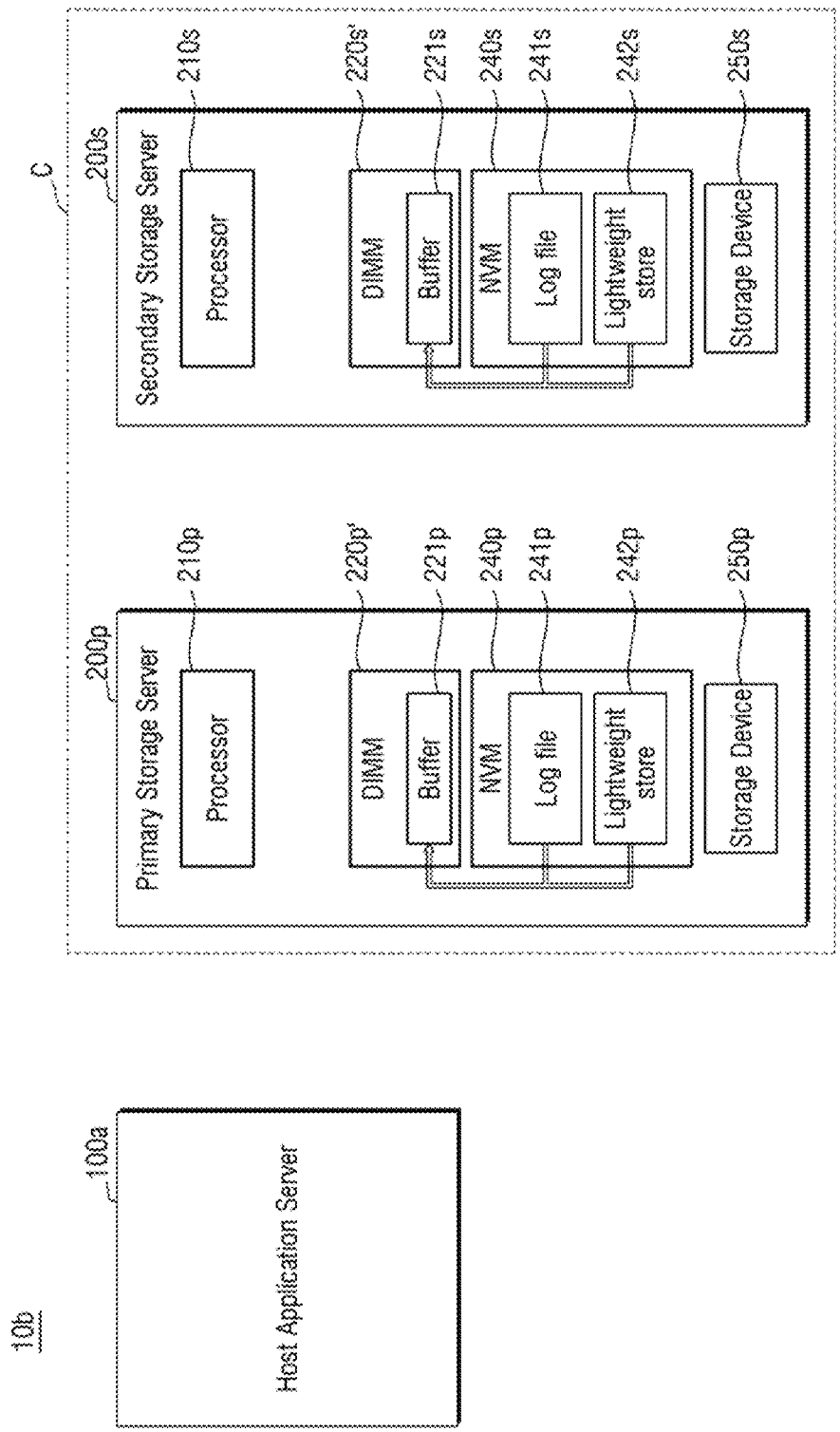
FIG. 15 is a block diagram for explaining operations of the storage server in the data center shown in FIG. 14.

FIG. 15 is a diagram for explaining the operation of the embodiment of FIG. 14. The operation of FIG. 15 may be performed before the host application server 100a provides the write command WCMD (see FIG. 5) in the embodiment of FIG. 2.

The first log file 241p and the first firmware 242p stored in the first non-volatile memory device 240p may be loaded onto the first DIMM 220p'. Programs for the first log file 241p and the first firmware 242p loaded onto the first DIMM 220p may be executed. Before executing the programs for the first log file 241p and the first firmware 242p in the first DIMM 220p', the first log file 241p and the first firmware 242p are loaded into the first DIMM 220p'.

Figure 16:
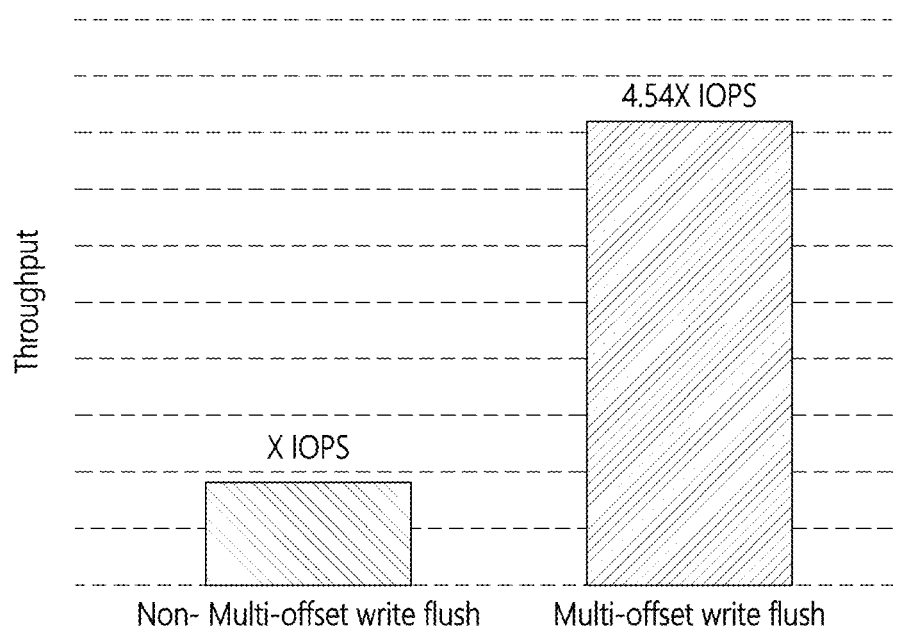
FIGS. 16 to 18 are diagrams for explaining the effect of the data center according to one or more embodiments.
Figure 17:
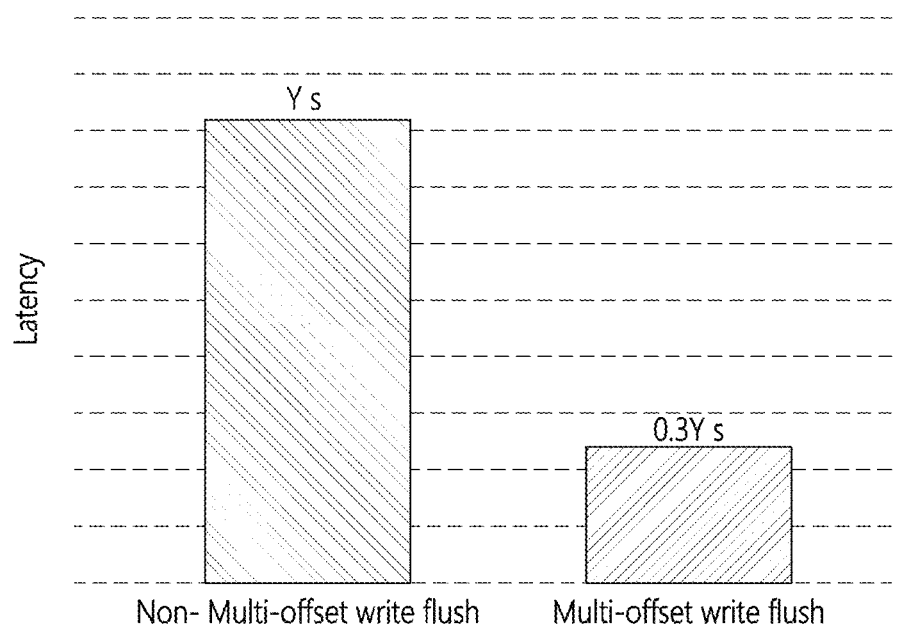
Figure 18:
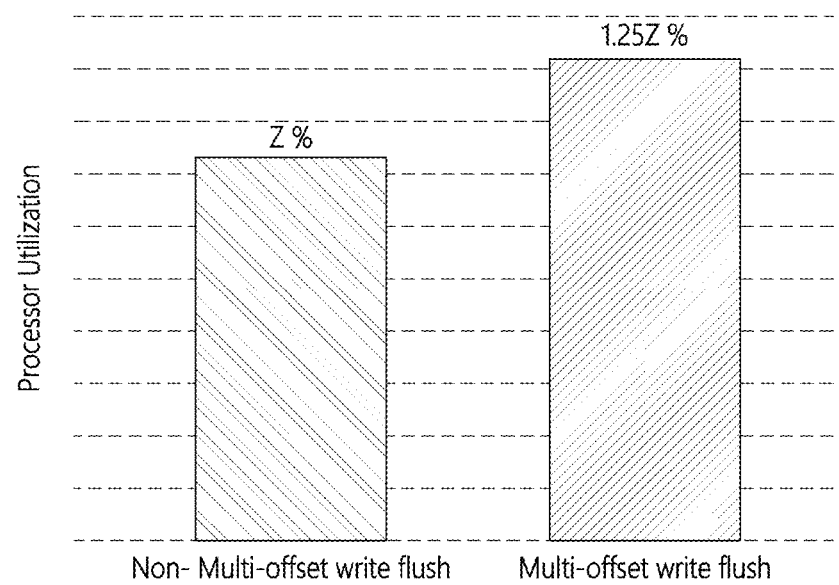

FIGS. 16 to 18 are diagrams for explaining the effect of the data center 10 according to the one or more embodiments.

Referring to FIGS. 2 and 16 to 18, the first and second storage servers 200p and 200s according to various embodiments may perform a multi-offset write operation on the write command WCMD. That is, the flush operation on the write command WCMD may be performed.

Referring to FIG. 16, the storage server which does not perform the multi-offset write operation performs×IOPS (I/O per second) operation. In contrast, the first and second storage servers 200p and 200s according to the one or more embodiments may execute 4.54×IOPS.

Referring to FIG. 17, a storage server which does not perform the multi-offset write operation requires the time of y seconds to perform a single I/O operation. In contrast, the first and second storage servers 200p and 200s according to the one or more embodiments only require the time of 0.3 y seconds to perform the single I/O operation.

Referring to FIG. 17, the processor of the storage server which does not perform the multi-offset write operation shows an efficiency of z % on the basis of performing the operation with fourth-eight cores. In contrast, the processors 210p and 210s of the first and second storage servers 200p and 200s according to the one or more embodiments show an efficiency of 1.25 z %.

The first and second storage servers 200p and 200s according to the one or more embodiments may perform a multi-offset write operation that simultaneously executes a plurality of flush write operations, thereby improving the efficiency of the one or more processors, reducing the delay time required to perform an I/O operation, and increasing the number of I/O operations performed per hour.

Some of the embodiments of the disclosure have been shown and described above. However, the one or more embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not to be construed as independent from the inventive concept or prospect of the disclosure.

What is claimed is:

1. A storage server comprising:
a processor configured to:
generate a plurality of flush write commands based on a write command of first data provided from a host,
provide a replication command corresponding to the write command to an external storage server, and
receive an operation completion signal of the replication command from the external storage server;
a memory storing a program of a log file to which the plurality of flush write commands are logged; and
a storage device,
wherein, after the processor receives the operation completion signal of the replication command from the external storage server, the processor is further configured to provide, to the storage device, a multiple offset write command including at least one from among the plurality of flush write commands logged to the log file, and
the storage device is configured to receive the multiple offset write command and perform a flush operation on the multiple offset write command.

2. The storage server of claim 1, wherein the processor is further configured to:
provide a return signal of the write command to the host after receiving the operation completion signal, and
provide the multiple offset write command to the storage device, after providing the return signal.

3. The storage server of claim 1, wherein the storage device is configured to receive the multiple offset write command, and simultaneously perform a plurality of write operations corresponding to the multiple offset write command.

4. The storage server of claim 1, wherein the memory is a non-volatile memory, and the log file is stored in the memory.

5. The storage server of claim 1, wherein the memory is a volatile memory, and
the log file is stored in a non-volatile memory device that is separated from the memory.

6. The storage server of claim 5, wherein the memory is a dynamic random access memory (DRAM).

7. The storage server of claim 5, wherein the processor is further configured to load the log file into the memory from the non-volatile memory device before executing the program for the log file in the memory.

8. The storage server of claim 1, wherein the plurality of flush write commands comprise a first flush write command and a second flush write command,
the first flush write command is a write command for the first data, and
the second flush write command is a write command for metadata of the first data.

9. The storage server of claim 1, wherein, based on a number of write commands logged to the log file being greater than or equal to a preset threshold log value, the processor is further configured to provide the multiple offset write command to the storage device based on the log file.

10. The storage server of claim 1, wherein the processor is further configured to provide the multiple offset write command to the storage device based on the log file after a predetermined threshold time elapses from a time of receiving the write command.

11. A method of driving a storage server, the method comprising:
generating a plurality of flush write commands based on a write command of first data provided from a host;
logging the plurality of flush write commands to a log file;
providing a replication command corresponding to the write command to an external storage server;
receiving an operation completion signal of the replication command from the external storage server; and
after receiving the operation completion signal of the replication command from the external storage server, providing a storage device with a multiple offset write command including at least one flush write command from among the plurality of flush write commands.

12. The method of driving the storage server of claim 11, further comprising:
providing a return signal of the write command to the host after receiving the operation completion signal, and
wherein the multiple offset write command is provided to the storage device after providing the return signal.

13. The method of driving the storage server of claim 11, further comprising simultaneously performing a plurality of write operations corresponding to the multiple offset write command.

14. The method of driving the storage server of claim 11, wherein the plurality of flush write commands comprise a first flush write command and a second flush write command,
the first flush write command is a write command for the first data, and
the second flush write command is a write command for metadata of the first data.

15. The method of driving the storage server of claim 11, wherein the log file is logged from a non-volatile memory, and the log file is stored in the non-volatile memory.

16. A data center comprising:
an application server providing a write command for first data;
a first storage server comprising:
a first processor configured to generate a plurality of first flush write commands based on the write command from the application server, and provide a replication command corresponding to the write command to a second storage server;
a first memory storing a first program of a first log file to which the plurality of first flush write commands are logged; and
a first storage device;
the second storage server comprising:
a second processor configured to generate a plurality of second flush write commands based on the replication command provided from the first storage server, and provide an operation completion signal to the first storage server;
a second memory storing a second program of a second log file to which the plurality of second flush write commands is logged; and
a second storage device,
wherein, after receiving the operation completion signal from the second storage server, the first processor is further configured to provide, to the first storage device, a first multiple offset write command including at least one first flush write command from among the plurality of first flush write commands logged to the first log file,
the first storage device is configured to receive the first multiple offset write command and perform a first flush operation on the first multiple offset write command,
after providing the operation completion signal to the first storage server, the second processor is further configured to provide to the second storage device, a second multiple offset write including at least one second flush write command from among the plurality of second flush write commands, and
the second storage device is configured to receive the second multiple offset write command, and perform a second flush operation based on the second multiple offset write command.

17. The data center of claim 16, wherein the first processor is further configured to:
provide a return signal of the write command to the application server after receiving the operation completion signal,
provide the first multiple offset write command to the first storage device after providing the return signal, and
wherein the second processor is further configured to provide the second multiple offset write command to the second storage device after providing the return signal.

18. The data center of claim 17, wherein the first multiple offset write command and the second multiple offset write command are respectively provided independently of each other.

19. The data center of claim 16, wherein the first storage device is further configured to receive the first multiple offset write command, and simultaneously perform the plurality of first flush write operations corresponding to the first multiple offset write command, and wherein the second storage device is further configured to receive the second multiple offset write command, and simultaneously execute the plurality of second flush write operations corresponding to the second multiple offset write command.

20. The data center of claim 16, wherein the first memory and the second memory are non-volatile memories, the first log file is stored in the first memory, and
   the second log file is stored in the second memory.

\* \* \* \* \*